United States Patent [19]

Smit

[11] 4,392,843
[45] Jul. 12, 1983

[54] METAL BELT

[75] Inventor: Geoffrey N. Smit, Rancho Palos Verdes, Calif.

[73] Assignee: Borg-Warner Corporation, Chicago, Ill.

[21] Appl. No.: 212,300

[22] Filed: Dec. 3, 1980

[51] Int. Cl.³ .............................................. F16G 5/18
[52] U.S. Cl. ..................................... 474/245; 474/201
[58] Field of Search ............... 474/201, 242, 244, 245, 474/272

[56] References Cited

U.S. PATENT DOCUMENTS

| 2,038,583 | 4/1936 | Maurer. | |
| 2,475,264 | 7/1949 | Sutton. | |
| 2,805,583 | 9/1957 | Besel. | |
| 3,364,767 | 1/1968 | Bredschneider et al. | 474/245 |
| 3,720,113 | 3/1973 | Van Doorne et al. | |
| 3,949,621 | 4/1976 | Beusink et al. | |
| 4,313,730 | 2/1982 | Cole et al. | 474/245 |

FOREIGN PATENT DOCUMENTS

| 87679 | 3/1922 | Austria | 474/201 |
| 1087849 | 8/1960 | Fed. Rep. of Germany | 474/245 |
| 578300 | 9/1924 | France | 474/201 |
| 39470 | 6/1913 | Sweden | 474/201 |
| 476518 | 12/1937 | United Kingdom | 474/245 |

Primary Examiner—Lawrence J. Staab
Attorney, Agent, or Firm—Aubrey L. Burgess

[57] ABSTRACT

A metal belt comprising a plurality of sets of interleaved sets or ranks of links which are joined by pivot means, such as a pin or a pin and rocker, to permit articulation, having blocks secured to each rank of links, the blocks being provided with surfaces to engage the opposed pulley flanges in a pulley drive system, as for example in a variable pulley transmission and the like.

5 Claims, 6 Drawing Figures

METAL BELT

BACKGROUND OF THE INVENTION

Flexible power transmission belts comprising an assembly of a plurality of steel strips and a plurality of V-shaped solid metal blocks are well known in the art. An example of such a construction is disclosed in U.S. Pat. No. 3,720,113 granted Mar. 13, 1973 to H. J. Van Doorne et al. In the patented structure the blocks are provided with lateral guides having relatively short top edges which overlie the steel strips to maintain the parts in assembled relationship.

Another example of a flexible power transmission belt described in U.S. Pat. No. 3,949,621 granted Apr. 13, 1976 to Beusink, deceased, et al, in which solid metal plates are mounted on metal strips, the strips being received in slots in the lateral edges of the plates.

Other flexible power transmission belts comprising an assembly of links, pins and pulley contact members are described in U.S. Pat. No. 2,038,383 granted Apr. 28, 1936 to Maurer, U.S. Pat. No. 2,475,264 granted July 5, 1949 to Sutton and U.S. Pat. No. 2,805,583 granted Sept. 10, 1957 to Besel.

SUMMARY OF THE INVENTION

The invention herein described comprises a metal belt comprising a plurality of interleaved sets or ranks of links which are joined by pivot means, such as a pin or a pin and rocker, to permit articulation thereof, and having a metal block secured to each rank of links, the blocks being provided with edge surfaces to engage the opposed flanges of pulleys in a pulley drive system, as for example, in a variable pulley transmission and the like.

More specifically, the securing of the blocks to the links can be achieved by an interference fit or by means of the interposition of a wedging member. Also the links may be specially shaped to have spaced projections to receive a block therebetween. In any event, the blocks are fixedly secured to the links so that the resultant thrust is transmitted by the blocks directly to the ranks of links.

DRAWINGS OF THE INVENTION

DETAILED DESCRIPTION OF THE INVENTION

Figure 1:
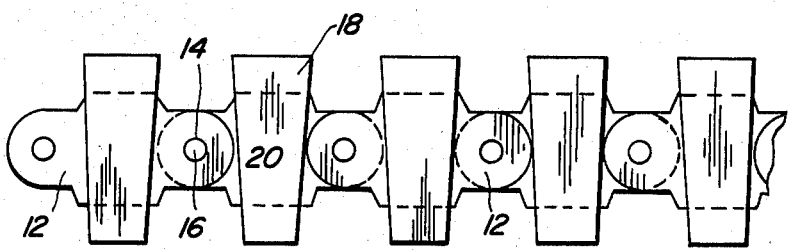
FIG. 1 illustrates one form of a belt according to this invention.
Figure 2:
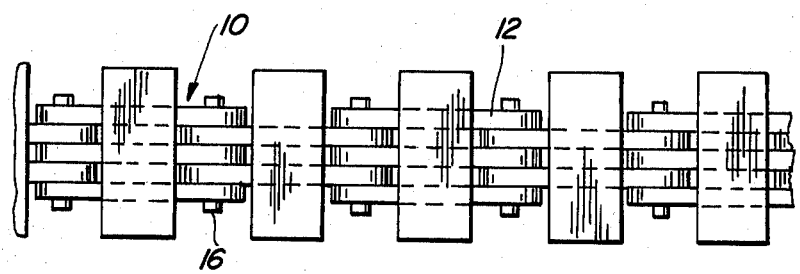
FIG. 2 illustrates a portion of a belt with one or more blocks in section, the blocks being frictionally secured to ranks of links by an interference fit.

The belt of FIGS. 1 and 2 comprises a plurality of sets or ranks 10 of links 12, each set or rank being joined to the next adjacent set or rank by pivot means 14 such as a pin 16. The pin 16 can be replaced with a pin and rocker joint as is known in the art, if necessary or desirable. Metal blocks 18 having lateral edge surfaces 20 are press-fit onto the ranks of links, each block being located between adjacent pivot means 14. The links shown in FIGS. 1 and 2 have somewhat reduced end portions; however, the links could be similar in shape to British Standard Roller Chain links as are known in the art.

Figure 3:
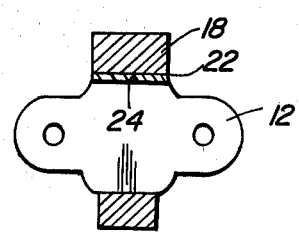
FIG. 3 illustrates another form of a belt according to this invention with a wedging member between the ranks of links and the blocks.

In the FIG. 3 embodiment, a wedging member 22 is inserted between the blocks 18 and the upper surface 24 of the links 12, the remainder of the parts being identified with the same reference characters as in the previous embodiment. The wedging member 22 secures a block 18 to a rank 10 of links 12.

Figure 4:
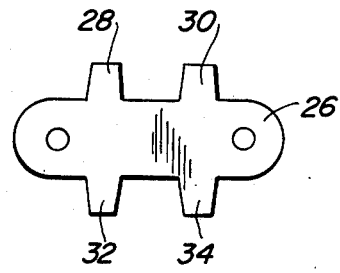
FIG. 4 illustrates still another form of this invention in which the links are of special shape.
Figure 5:
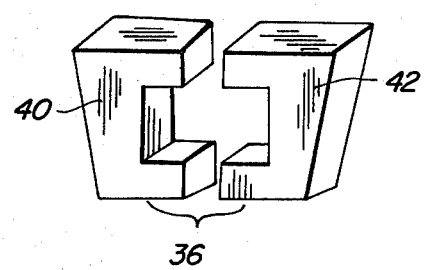
FIG. 5 illustrates the form of FIG. 4 and especially a split block to enhance assembly of the belt.

Still another embodiment is illustrated in FIGS. 4 and 5 and, in this embodiment, the links 26 are each provided with spaced extending upper fingers 28, 30 and lower fingers 32, 34. A block 36 is secured to a rank of such links 26, being secured to the links by an interference fit.

Each set of fingers defines a slot into which a block 36 is received. In order to enhance the assembly of a chain as in FIGS. 4 and 5, each block 36 can be constructed in two parts, 40 42 such that they can be easily assembled on the links 26.

Figure 6:
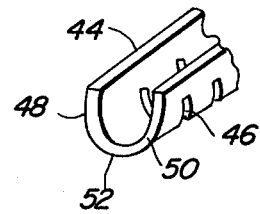
FIG. 6 illustrates a stamping to provide location for split blocks as illustrated in FIG. 5.

In order to reinforce and locate split blocks as particularly illustrated in FIG. 5, a generally U-shaped stamping 44 can be incorporated in the structure, see FIG. 6. The stamping 44 is provided with a plurality of spaced slots 46, each to fit over a link 26 in the transverse set of links; the sides 48, 50 of the stamping 44 can be such to frictionally engage the opposite sides of the blocks 36 and the lower surface 52 engaging the tops of the links, such as the member 22 in FIG. 3.

In all embodiments, the blocks can also be, if necessary, spot welded to at least one of the links with which a block is associated, without departing from the spirit of the invention.

I claim:

1. An endless metal chain belt adapted for use in connecting pulleys in a pulley drive system wherein each pulley is constructed of a pair of flanges, said belt comprising:

a plurality of sets of links, each set of which is interleaved with the next adjacent sets of links;

pivot means joining the next adjacent sets of links to form an endless chain and to permit articulation thereof; and metal drive blocks, each having a central window bounded by a bottom, top and sides, and each surrounding a set of links;

each drive block means being located between and generally spaced from the next adjacent pivot means;

each drive block means being frictionally positioned and secured to its set of links.

2. An endless metal chain belt as recited in claim 1, further comprising a member interposed between each set of links and its drive block means frictionally positioning and securing each drive block means to its set of links.

3. An endless metal chain belt as recited in claim 1, in which each drive block means is frictionally secured to its link set by an interference fit.

4. An endless metal chain belt as recited in claim 1, in which each link is provided with a pair of upwardly directed spaced fingers and a pair of opposed and downwardly directed spaced fingers, said pairs of fingers being located between the pivot members and in which a drive block means is positioned between the upper and lower spaced fingers.

5. An endless metal chain belt as recited in claim 4, in which each drive block means is of two part construction, each part of which includes a part of said window.

* * * * *